United States Patent [19]

Duchene

[11] Patent Number: 5,391,395
[45] Date of Patent: Feb. 21, 1995

[54] METHOD OF PREPARING SUBSTRATES FOR MEMORY DISK APPLICATIONS

[75] Inventor: Joseph R. Duchene, Howell, Mich.

[73] Assignee: Witco Corporation, New York, N.Y.

[21] Appl. No.: 998,453

[22] Filed: Dec. 30, 1992

[51] Int. Cl.⁶ .............................................. C23C 26/00
[52] U.S. Cl. ................................... 427/129; 427/131; 427/304; 427/305; 427/437; 427/438; 427/443.1
[58] Field of Search ............... 427/437, 438, 443.1, 427/304, 305, 129, 131

[56] References Cited

U.S. PATENT DOCUMENTS

| | | | |
|---|---|---|---|
| 3,202,529 | 8/1965 | Dunlap | 427/438 |
| 4,042,382 | 8/1977 | Feldstein | 427/443.1 |
| 4,244,739 | 1/1981 | Cagnassi | 427/304 |
| 4,657,788 | 4/1987 | Benton | 427/435 |
| 4,659,605 | 4/1987 | Malik | 427/129 |
| 5,069,967 | 12/1991 | Yokoyama | 427/131 |
| 5,141,778 | 8/1992 | Yarkosky | 427/438 |

Primary Examiner—Shrive Beck
Assistant Examiner—Vi Duong Dang
Attorney, Agent, or Firm—Lockwood, Alex, FitzGibbon & Cummings

[57] ABSTRACT

An improved process is disclosed for treating aluminum for memory disk applications and for producing metal plated aluminum memory disks. It has been found that a solution prepared from methane sulfonic acid and sodium peroxydisulfate can be used as a direct replacement for a nitric acid bath in the processing of aluminum substrates for memory disk application. In accordance with the present invention, the methane sulfonic acid/sodium peroxydisulphate solution can be used to deoxidize the aluminum substrate prior to zinc deposition and also to remove the first zinc film in either alkaline or acid double zinc plating processes.

16 Claims, No Drawings

METHOD OF PREPARING SUBSTRATES FOR MEMORY DISK APPLICATIONS

BACKGROUND AND DESCRIPTION OF THE INVENTION

The present invention generally relates to a process of producing magnetic recording media and to products produced thereby. More particularly, the present invention relates to metal plating of zinc plated aluminum and, more specifically, to an improved process of treating a substrate aluminum to provide an exceptional surface condition prior to further plating processes. The present invention is particularly advantageous in both alkaline and acid double zinc plating processes.

Magnetic recording impulse memory devices are extensively used in computer and data processing systems. These devices generally include a substrate on which a thin film of magnetic material has been deposited. The present invention has particular advantageous application to the manufacture of rigid memory disks having large storage capacities.

The requirements of the magnetic recording media of these disks are critical since the reading and writing of information data on the surfaces thereof are usually performed by magnetic transducers which are supported in flying heads positioned in closely spaced relation to the surfaces of the disk. Aluminum is the preferred substrate for the disks although other suitable metals may be employed. In general, a relatively thin layer of nonmagnetic electroless nickel is applied on the aluminum followed by a thin layer of magnetic material such as cobalt. A signal is stored on the disk by magnetizing the cobalt layer to represent the signal at a selected moment in time.

Typical alloys used for memory disks are Aluminum Association Nos. 5086 and 5586. Rigid memory disks have, in the past, commonly been manufactured by initially cleaning the surface of an aluminum disk which renders it receptive to a non-magnetic coating, electrolessly depositing a non-magnetic nickel containing layer thereon, cleaning and activating, or cleaning, activating and mechanically polishing that non-magnetic layer to make it receptive to a magnetic layer, and then depositing a magnetic electroless cobalt containing layer thereon. Thereafter, the disk can be cleaned and a lubricant or other protective coating may be applied over the magnetic layer.

U.S. Pat. No. 4,659,605 discloses a process for producing a high density magnetic storage device such as a rigid memory disk having improved magnetic recording properties and comprising the steps of cleaning the surface of a substrate to provide a substantially oil and oxide free substrate surface, electrodepositing a non-magnetic nickel-phosphorus layer on the substrate and, electrolessly depositing a magnetic cobalt-phosphorus layer consisting essentially of cobalt and phosphorus on the nickel-phosphorus layer wherein the electroless cobalt-phosphorus deposition is conducted in an ammonia-free bath containing a source of cobalt ions, a source of hypophosphite ions, and a complexor constituent which includes conjointly, an effective amount of each of a source of citrate ions and a low molecular weight, bath soluble amino acid. The '605 patent also discloses a process wherein the cleaned substrate is zinc plated prior to the deposition of the non-magnetic nickel-phosphorus layer. The '605 patent further discloses the zinc coated substrate can be subjected to a zinc stripping operation by immersion of the disk in a suitable acid such as, for example, nitric acid, followed by a further zinc plating step.

U.S. Pat. No. 5,141,778 discloses a method of preparing aluminum memory disks using a double zinc plating procedure wherein a nitric acid bath initially consisting essentially of nitric acid and a specified added amount of a Group VIII ion is used to treat the first zinc coated substrate and the zinc coated aluminum substrate is plated using an electroless metal plating bath containing an effective amount of cadmium ions. As noted by the '778 patent, aluminum alloys when exposed to the air rapidly forms an oxide which can present plating problems. As a result, special treatments must be employed when plating on aluminum. These treatments generally include mechanical treatments; chemical etches; alkaline displacement solutions; and anodizing.

Despite the existence of methods for treating aluminum for subsequent plating the need still exists for an improved process of preparing an aluminum substrate for memory disk applications. In this regard, although nitric acid baths have been used to prepare the aluminum substrate for subsequent plating and to remove the first layer of zinc deposited thereon in double zinc plating processes, the presence of nitrate ions has been found in certain applications to limit the effectiveness and degree of depositing zinc upon the substrate. The surface condition of the zinc coated aluminum can affect the surface condition of the non-magnetic nickel layer deposited thereon. The degree of subsequent polishing of the nickel coated layer depends upon the condition of the nickel coat. Accordingly, it is desirable to have the best possible zinc coated aluminum substrate prior to nickel deposition.

SUMMARY OF THE INVENTION

In accordance with the present invention, an improved process is provided for treating aluminum for memory disk applications and for producing metal plated aluminum memory disks. It has been found that a solution prepared from methane sulfonic acid and sodium peroxydisulfate can be used as a direct replacement for a nitric acid bath in the processing of aluminum substrates for memory disk application. In accordance with the present invention, the methane sulfonic acid/sodium peroxydisulphate solution can be used to deoxidize the aluminum substrate prior to zinc deposition and also to remove the first zinc film in either alkaline or acid double zinc plating processes. The methane sulfonic acid/ sodium peroxydisulphate solutions are compatible with acid zinc immersion processes and avoid the toxic fumes of nitric oxide associated with the use of nitric acid. Additionally, acceptable activity levels can be maintained without significant volume changes and without the use of fluorides, borates, phosphates or nitrates. Furthermore, the present invention can be used with the same equipment used with nitric acid deoxidizing processes and waste treatment is simplified because of the absence of chelates.

It is, therefore, a general object of the present invention to provide a new and improved process for producing aluminum memory disks.

Another object of the present invention is to provide an improved method for deoxidizing and conditioning of an aluminum substrate for memory disk applications.

Another object of the present invention is to provide an improved double zinc plating process for the metal plating of aluminum for memory disk applications which improved process eliminates the use of nitrate ions.

Another object of the present invention is to provide an improved process for the metal plating of aluminum for memory disk applications which process reduces the amount of environmentally undesirable constituents and thereby eases waste treatment.

Another object of the present invention is to provide an improved process for preparing aluminum memory disks which can be utilized with the same equipment used for existing processes.

Another object of the present invention is to minimize the degree of polishing necessary to place a nickel plated aluminum substrate in condition for memory disk applications.

These and other objects of the present invention will be apparent from the following description of a preferred embodiment thereof.

DETAILED DESCRIPTION OF THE INVENTION

Methods for preparing aluminum substrates for memory disk applications and memory disks therefrom are well-known in the art. Included in these well-known methods are double zinc plating methods, both alkaline and acid, for preparing aluminum substrates for memory disk applications.

While the specific double zinc plating method employed may vary according to the alloys treated and the claimed results, heretofore such methods commonly used a nitric acid dip to remove the first zincate film. Known double zinc plating procedures for preparing aluminum substrates for memory disk applications are set forth, for example, in U.S. Pat. No. 4,659,605 and in U.S. Pat. No. 5,141,778, which are incorporated herein by reference.

The present invention departs from the previous use of a nitric acid dip to remove the first zinc film in such double zinc plating processes. In accordance with the present invention, the first zinc film is removed without the use of nitric acid. In this regard, the present invention utilizes a non-nitric acid deoxidizer to strip the zinc immersion coating from the aluminum substrate in a double zinc plating process for preparing aluminum substrate memory disks.

The non-nitric acid deoxidizer of the present invention is a solution comprising sodium peroxydisulfate, potassium peroxydisulfate or ammonium peroxydisulfate. From an environmental and waste treatment perspective, preferably the solution contains sodium peroxydisulfate or potassium peroxydisulfate. More preferably the solution contains sodium peroxydisulfate.

It will be appreciated by those skilled in the art that in certain applications the peroxydisulfate may, alone, be sufficiently acidic to provide effective removal of the first zinc coat. Preferably, however, the non-nitric acid deoxidizer solution of the present invention also contains an added acid. Preferably, the added acid is an alkyl sulfonic acid or sulfuric acid. Alkyl sulfonic acids having carbon chains ranging from $C_1$ to $C_{18}$ are preferred with methane sulfonic acid being more preferred.

A preferred non-nitric acid deoxidizer solution of the present invention is a solution containing methane sulfonic acid and sodium peroxydisulfate. For convenience, but by way of illustration only and not limitation, methane sulfonic acid and sodium peroxydisulfate are used herein as exemplary materials and values provided for such materials, such as concentration ranges, are representative values for such materials.

The non-nitric acid deoxidizer solution of the present invention is preferably prepared with deionized water and contains methane sulfonic acid in a concentration of about 1 percent to 6 percent by volume, preferably 2 percent to 5 percent by volume, and sodium peroxydisulfate in a concentration of about 10 grams to 120 grams per liter, preferably 50 grams to 70 grams per liter. It will be appreciated to those skilled in the art that the foregoing concentration ranges can be converted to an equivalent basis. The non-nitric acid dioxide solution of the present invention typically will have a pH of around 0.5 to 0.9 and an operating range of around 70° to 90° F.

The non-nitric acid deoxidizer solution of the present invention can be prepared by: (1) adding approximately 80% of the required amount of deionized water to a suitable vessel; (2) while mixing, adding the required amount of methane sulfonic acid; (3) while mixing, adding the required amount of sodium peroxydisulfate; and, (4) adding deionized water to adjust the solution to final volume and mixing until all components are dissolved.

It has been found that the non-nitric acid deoxidizing solution of the present invention is useful not only to remove the first zinc coat in double zinc plating aluminum substrate memory disk applications but also to pretreat the aluminum substrate prior to initial zinc plating in aluminum substrate memory disk applications. A typical procedure for preparing aluminum memory disks in accordance with the present invention is as follows and it should be understood that water rinses are generally employed after each processing step with deionized water rinses being preferred and that appropriate apparatus will be utilized such as, for example, a commonly used 36 inch barrel plater.

The first step is usually to clean the aluminum surface of grease and oil using a chelate, silicate, and borate-free, soak cleaner that is especially formulated to clean polished or diamond tuned aluminum memory disks without etch such as Niklad Alprep 203 (alkaline non-etch cleaner) sold by Witco Incorporated, Allied-Kelite Division, New Hudson, Mich. (Witco Corporation) may be suitably employed. In this regard, the aluminum substrate can be treated with a 20 percent by volume solution of Alprep 203 at 140° F. to 150° F. for 3 to 5 minutes. Thereafter the aluminum substrate can be cold water rinsed for about 1-½ minutes.

The aluminum substrate can be further cleaned by a suitably employed acidic, non-etch cleaner designed for aluminum memory disks such as Niklad Alprep 232 sold by Witco Corporation. The Alprep 232 can be used in a 10 percent by volume solution, at 140° F. to 150° F. for 3 to 5 minutes. Thereafter, the aluminum substrate can be cold water rinsed for about 1-½ minutes.

Preferably, the aluminum substrate is further treated with the non-nitric acid deoxidizer solution of the present invention at room temperature for about 12 to 30 seconds. Such solution will preferably contain methane sulfonic acid in a concentration between 2 to 5 percent by volume and sodium peroxydisulfate in a concentration between 50 to 70 grams per liter. The aluminum substrate is thereafter preferably cold water rinsed for about 1-½ minutes.

It is at this point that a zinc coating is applied to the aluminum by immersion in a zinc bath as is well known in the art. For example, a slightly acidic immersion zinc process for activating aluminum prior to electroless nickel deposition such as ARP 350-ZN sold by Witco Corporation can be utilized for two to three minutes at room temperature. Thereafter, the zinc plated aluminum substrate is preferably cold water rinsed for about 1-½ minutes.

Generally, in prior art double zinc plating processes, the first zinc coating would now be removed with a solution containing nitric acid. In accordance with the present invention the first zinc coating is now removed utilizing the non-nitric acid deoxidizer solution of the present invention. In this regard, the zinc plated aluminum substrate is immersed in the non-nitric acid deoxidizer solution of the present invention at room temperature for about 12 to about 30 seconds. Such solution will preferably contain methane sulfonic acid in a concentration between 2 to 5 percent by volume and sodium peroxydisulfate in a concentration between 50 to 70 grams per liter. Thereafter, preferably, the aluminum substrate is cold water rinsed for about 1-½ minutes.

Thereafter another zinc immersion step is conducted such as by using ARP 350-ZN for 2 to 3 minutes at room temperature with subsequent cold water rinsing for about 1-½ minutes.

The zinc plated aluminum substrate can now be nickel plated as is well known in the art such as with a Niklad Electroless Nickel plate sold by Witco Corporation to provide a non-magnetic coating on the aluminum substrate prior to deposition of the memory material. The nickel plated substrate can be polished as necessary. In accordance with the present invention, the degree of polishing of the nickel surface should be less than that associated with nitric acid deoxidizing processes. Any acceptable memory material may be used but, in general, cobalt will typically be used and applied, such as by electrodeposition or sputtering, onto the nickel plated zinc coated aluminum substrate to provide an appropriate memory disk.

The non-nitric acid deoxidizer solution of the present invention can be easily maintained without significant loss of properties for processing several loads of aluminum. In this regard, it is suggested to analyze the level of sodium peroxydisulfate on a routine basis and to make additions to the solution as necessary. Normally, after initial preparation of the solution, it is not necessary to add further methane sulfonic acid. Typically, however, deoxidizing immersion times can be reduced with increased methane sulfonic acid additions. The solution of the present invention can be readily waste treated by diluting and neutralizing the solution with soda ash or sodium hydroxide to a pH of approximately 9.2 to remove metallics. Thereafter the solution can be filtered or separating and disposed of according to local and federal regulations.

While the foregoing specification sets forth various embodiments of the present invention in detail, it will be appreciated that modifications thereto may be made without departing from the spirit and scope thereof.

What is claimed is:

1. A double zinc plating process for preparing aluminum and aluminum alloys for magnetic memory disk substrates comprising applying a zinc coating on the aluminum using a double zinc plating procedure wherein a nitrate free, sulfur containing acid solution is used to treat the first zinc coated substrate prior to depositing the second zinc coat, said solution formulated with a peroxydisulfate component and with a sulfonic acid component, said peroxydisulfate component selected from the group consisting of sodium peroxydisulfate, potassium peroxydisulfate, and ammonium peroxydisulfate components and mixtures thereof and said sulfonic acid component selected from the group consisting of $C_1$-$C_{18}$ alkyl sulfonic acids and mixtures thereof.

2. The method of claim 1 wherein said peroxydisulfate component is sodium peroxydisulfate and said sulfonic acid component is methane sulfonic acid.

3. The method of claim 2 wherein said methane sulfonic acid is present in said solution in a concentration of about 1 percent to 6 percent by volume and said sodium peroxydisulfate is present in such solution in a concentration of about 10 grams to 120 grams per liter.

4. The method of claim 3 wherein the concentration of said methane sulfonic acid is about 2 percent to 5 percent by volume in said solution.

5. The method of claim 3 wherein the concentration of said sodium peroxydisulfate in said solution is about 50 grams to 70 grams per liter.

6. The method of claim 1 wherein said aluminum is pretreated prior to deposition of the first zincate coat with said solution.

7. The process of claim 1 wherein said double zinc coated aluminum substrate is further coated with a non-magnetic layer comprising nickel and subsequently coated with a magnetic material.

8. The method of claim 7 wherein said magnetic material comprises cobalt.

9. A process for producing a high magnetic storage device based upon an aluminum substrate comprising the steps of:
cleaning the surface of said substrate for said device to provide a substantially oil and oxide free substrate surface;
electrolessly depositing a zinc coating on said substrate surface;
treating said zinc coated substrate with a non-nitric acid containing deoxidizer solution formulated with a peroxydisulfate component and with a sulfonic acid component, said peroxydisulfate component selected from the group consisting of sodium peroxydisulfate, potassium peroxydisulfate and ammonium peroxydisulfate and mixtures thereof, and said sulfonic acid component selected from the group consisting of $C_1$-$C_{18}$ alkyl sulfonic acids and mixtures thereof;
electrolessly depositing a zinc coating on said treated substrate;
depositing a non-magnetic nickel layer on said double zinc coated substrate; and,
depositing a magnetic layer thereon.

10. The process of claim 9 wherein said peroxydisulfate component is sodium peroxydisulfate and said sulfonic acid acid component is methane sulfonic acid.

11. The method of claim 10 wherein said methane sulfonic acid is present in said solution in a concentration of about 1 percent to 6 percent by volume and said sodium peroxydisulfate is present in such solution in a concentration of about 10 grams to 120 grams per liter.

12. The method of claim 11 wherein the concentration of said methane sulfonic acid is about 2 percent to 5 percent by volume in said solution.

13. The method of claim 12 wherein the concentration of said sodium peroxydisulfate in said solution is about 50 grams to 70 grams per liter.

14. A process for producing a high density magnetic storage device based upon an aluminum substrate comprising cleaning the surface of said substrate for said device to provide a substantially oil and oxide free substrate surface said cleaning including utilizing a non-nitric acid containing deoxidizer solution formulated with sulfur containing compounds selected from the group consisting of sodium peroxydisulfate, potassium peroxydisulfate, ammonium peroxydisulfate, $C_1$–$C_{18}$ alkyl sulfonic acids and mixtures thereof, and thereafter plating said substrate surface to produce a high density magnetic storage device.

15. The process of claim 14 wherein said compounds are sodium peroxydisulfate and methane sulfonic acid.

16. The method of claim 15 wherein said methane sulfonic acid is present in said solution in a concentration of about 1 percent to 6 percent by volume and said sodium peroxydisulfate is present in such solution in a concentration of about 10 grams to 120 grams per liter.

* * * * *